(12) United States Patent
Strandberg et al.

(10) Patent No.: US 11,411,399 B2
(45) Date of Patent: Aug. 9, 2022

(54) ARRANGEMENT AND METHOD FOR A POWER BUS

(71) Applicant: Vacon Oy, Vaasa (FI)

(72) Inventors: Stefan Strandberg, Vörå (FI); Risto Komulainen, Klaukkala (FI)

(73) Assignee: Vacon Oy, Vaasa (FI)

( * ) Notice: Subject to any disclaimer, the term of this patent is extended or adjusted under 35 U.S.C. 154(b) by 214 days.

(21) Appl. No.: 15/999,354

(22) PCT Filed: Feb. 18, 2016

(86) PCT No.: PCT/EP2016/053433
§ 371 (c)(1),
(2) Date: Aug. 17, 2018

(87) PCT Pub. No.: WO2017/140360
PCT Pub. Date: Aug. 24, 2017

(65) Prior Publication Data
US 2019/0081475 A1  Mar. 14, 2019

(51) Int. Cl.
*H02J 1/00* (2006.01)
*H02J 1/12* (2006.01)
*H02J 4/00* (2006.01)

(52) U.S. Cl.
CPC .................. *H02J 1/12* (2013.01); *H02J 4/00* (2013.01); *H02J 1/002* (2020.01)

(58) Field of Classification Search
CPC .................. H02J 1/12; H02J 1/002; H02J 4/00
USPC ......................................................... 307/82
See application file for complete search history.

(56) References Cited

U.S. PATENT DOCUMENTS

| | | | | |
|---|---|---|---|---|
| 9,455,652 | B2* | 9/2016 | Ueno ................... | H02H 7/0838 |
| 2002/0039302 | A1* | 4/2002 | Hanaoka ............... | H02M 7/493 |
| | | | | 363/71 |
| 2012/0268049 | A1* | 10/2012 | Lund ..................... | H02K 16/00 |
| | | | | 318/400.26 |
| 2013/0200714 | A1 | 8/2013 | Pan et al. | |
| 2013/0249457 | A1* | 9/2013 | Gallegos-Lopez ..... | H02P 21/14 |
| | | | | 318/400.23 |
| 2015/0137595 | A1 | 5/2015 | Xu et al. | |

FOREIGN PATENT DOCUMENTS

| | | |
|---|---|---|
| CN | 1581631 A | 2/2005 |
| CN | 104967111 A | 10/2015 |
| CN | 104979852 A | 10/2015 |

(Continued)

OTHER PUBLICATIONS

International Search Report for PCT Serial No. PCT/EP2016/053433 dated Jul. 7, 2016.

*Primary Examiner* — Daniel Kessie
*Assistant Examiner* — Dru Parries
(74) *Attorney, Agent, or Firm* — McCormick, Paulding & Huber PLLC

(57) ABSTRACT

A method for a direct current (DC) power distribution arrangement and a direct current (DC) power distribution arrangement, comprising a plurality of DC power distribution subsystems. Each DC power distribution subsystem comprises an inverter unit (INU) configured to operate as a subsystem-specific circuit breaker for intercoupling/separating the DC power distribution subsystem to/from the rest of the DC power distribution arrangement.

21 Claims, 2 Drawing Sheets

(56) References Cited

FOREIGN PATENT DOCUMENTS

| | | |
|---|---|---|
| CN | 204886183 U | 12/2015 |
| EP | 2394861 A2 | 12/2011 |
| WO | 2014125279 A2 | 8/2014 |

\* cited by examiner

ARRANGEMENT AND METHOD FOR A POWER BUS

CROSS-REFERENCE TO RELATED APPLICATIONS

This application is a National Stage application of International Patent Application No. PCT/EP2016/053433, filed on Feb. 18, 2016, which is hereby incorporated by reference in its entirety.

TECHNICAL FIELD

The object of this invention relates to a power bus arrangement and a method for a power bus arrangement. More particularly, the object of the present invention is arrangement and method for using an inverter unit as a circuit breaker device for intercoupling/separating a number of direct current (DC) power distribution buses.

BACKGROUND

In large power electronic installations power distribution means are needed between power supplying/generating devices and power consuming devices. Due to the widespread exploitation of frequency converter technology, wherein a rectifier unit and an inverter unit are intercoupled via a DC intermediate circuit, it is a common practice to use a DC power bus as a distribution channel between a number of power generating devices and power consuming devices.

In certain environments, like in marine installations, there is also a need to divide the power distribution system into a plurality of smaller subsystems. For redundancy reasons the subsystems need to be connectable together and separable via so-called DC bus tie breakers, e.g. in order to avoid a full power outage due to a local catastrophic failure which could collapse the voltage of the power distribution bus.

Electro-mechanical circuit breaker is the normally used device for intercoupling/separating different power buses. The interruption of direct current may however be problematic due to the generated continuous arc during the contact opening. This is why a DC circuit needs a special circuit breaker, which is expensive. Due to the mechanical operation principle the circuit breaker is also relatively slow, which may be a problem when trying to avoid a wide area power distribution disturbances e.g. in case of local short-circuit.

SUMMARY

The objective of this invention is an arrangement and a method which avoids the drawbacks of electro-mechanical circuit breakers and which can be exploited in intercoupling/separating a number of DC power distribution buses, e.g. as a tie breaker in marine installation. The objective is achieved by the arrangements characterized by what is stated in the characterization part of the independent claims. Other preferred embodiments of the invention are the objects of the dependent claims.

The basic characteristic principle of the present invention is that similar inverter units (INU), as used in frequency converters for motor speed control systems or in active front end converters (AFE), are used as circuit breakers in DC power distribution systems. Using a standard INU in this context means exploitation the same hardware (i.e. power and control electronics circuits and mechanics) while the software determining how the controllable power switches are controlled is specific to this application. It should be understood here that parallel-connected INUs, which arrangement may be used for enhancing the current interrupting capacity, logically corresponds one INU in this context.

According to a first embodiment of the invention the DC terminals of each INU belonging to the system are connected to an INU-specific DC power distribution bus, and the INUs are interlinked by using connecting members between their AC terminals A connecting member may be e.g. a conductor rail or a power cable, and it may comprise an inductive component in order to limit balancing current transients in switching situations. The installation of connection members is permanent, but only a part of them may be selected to be in use at a time, by controlling the controllable power switches of INUs according to the present invention.

According to a second embodiment of the invention each of the three AC phase terminals of an INU belonging to the system is connected to a phase-specific connecting member.

In an embodiment related to the second embodiment, the controllable power switches of INUs are controlled such that only a part of connecting members, e.g. two of the three connecting members, are in use at a time. In a static operation mode the same connecting members are used continuously, and in a dynamic operation mode, in order to balance the loads, the connection sequences are rotated such that the average load of each phase is essentially equal. The implementation of the dynamic operation mode requires presence of an upper level controller which is able to control the turning on/off of any controllable power switches, such as IGBTs, in any INU belonging to the system.

In another embodiment related to the second embodiment, the controllable power switches of INUs are controlled such that all three connecting members are in use all the time, one of them connected to the positive poles of all DC power distribution systems and the other two to the minus poles, or vice versa. Also in this embodiment either a static or a dynamic operation mode may be used.

According to a third embodiment of the invention the number of the connecting members is such that the AC terminals of each INU can be connected to a different unique combination of connecting members. E.g. in case of 3 or 4 power buses and INUs with 3 AC terminals this combination requirement implies that the number of connecting members is at least 4, in case of 5 power buses at least 5 connection members are needed, etc.

Both static and dynamic operation modes are possible also with the third embodiment. In an embodiment relating to this third embodiment, in case of a catastrophic failure collapsing one DC power bus voltage and short-circuiting three connecting members, the power switches of INUs are controlled such that the connection between the undamaged DC power buses remains.

In the fourth embodiment of the invention two DC power distribution buses are interconnected by two INUs such that one INU is connected between the positive poles of both buses and another INU between the negative poles. In the connection, one DC terminal of an INU is connected to one DC power distribution bus pole, and all three AC phase terminals are connected in parallel to the corresponding pole of another DC power distribution bus. INUs are connected such that the conduction direction of the freewheeling diodes in both INUs are the same, with the effect that in case of no controllable power switch, e.g. IGBT, is turned on there is no balancing current path between the power buses, which thus are separated in this situation.

In an embodiment related to the fourth embodiment, the controllable power switches of an INU are controlled so that all three phase switches are always in the same position.

In an embodiment related to all previous arrangements, the energy storage capacitors of all other DC-links may be initially charged by an inverter connected to one externally fully charged DC power bus, by adjusting its pulse-width modulated output voltage to rise smoothly to the full level. As is clear to a person skilled in the art, due to the full level voltage pulses the implementation of this method requires connection members with some inductance in order to limit charging current pulses.

In an embodiment related to all previous arrangements, all controllable power switches, e.g. IGBTs, of one or several INUs may stay continuously turned off. In this case the DC power can flow, via the freewheeling diodes, only to the direction of the power subsystems connected to these INUs (i.e. a one-direction power flow).

In an embodiment related to all previous arrangements, the internal load current measurement of standard INUs is utilized by turning off one or all controllable power switches, such as IGBTs, in case of measured overcurrent. If all controllable power switches are turned off, only one-direction power flow is enabled. If only that controllable power switch is turned off, which carried the overcurrent, the operation may be continued by energizing another connection member via another AC phase terminal. In this case the controllable power switches which are connected to the overloaded connection member are turned off also in other INUs, and corresponding (upper or lower leg) controllable power switches in another phase of all INUs having connection to a common connection member are turned on.

The present invention makes it possible to realize a short-circuit proof DC current circuit breaker function by exploiting a widely used technology in power electronics industry. The interconnecting/separating time of DC power distribution buses is faster and requires less cost than by using prior art electro-mechanical switches. When the system comprises an upper control device, the dynamic operation mode can be implemented by alternating the connection turns of different connection members and phase switches of INUs, in order to balance the loads. From the field service point of view it is a benefit to utilize similar power modules in DC current circuit breakers than in motor drives and active front end converters.

BRIEF DESCRIPTION OF THE DRAWINGS

In the following, the invention will be described in more detail by the aid of some examples of its embodiments with reference to the attached drawings, wherein.

DETAILED DESCRIPTION

Unless defined otherwise, technical and scientific terms used herein have the same meaning as is commonly understood by one of ordinary skill in the art to which this disclosure belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced items. The use of "including", "comprising" or "having" and variations thereof herein are meant to encompass the items listed thereafter and equivalents thereof as well as additional items. The terms "connected" and "coupled" are not restricted to physical or mechanical connections: or couplings, and can include electrical connections or couplings, whether direct or indirect. Furthermore, the terms "circuit" and "circuitry" and "controller" may include either a single component or a plurality of components, which are either active and/or passive and are connected or otherwise coupled together to provide the described function.

Figure 1:
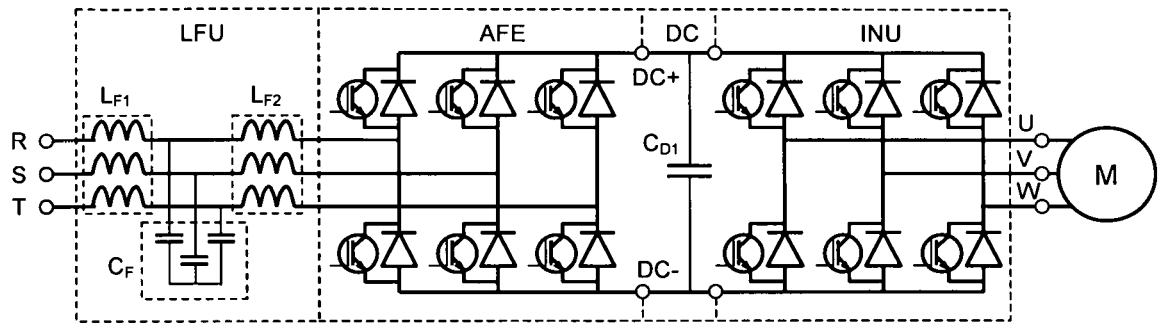
FIG. 1 presents the main circuit of a frequency converter drive.

FIG. 1 presents a simplified main circuit diagram of a known and typical regenerative frequency converter as an example where the power units exploited in circuit breaker arrangements according to the present invention can be normally used.

In the example the converter comprises an active front end bridge AFE, which is able to feed power in both directions between the 3-phase mains network R, S, T, and the intermediate DC-circuit DC. AFE is connected to the mains via a so-called LCL line filter unit LFU, comprising a first 3-phase inductor unit $LF_1$, a second 3-phase inductor unit $LF_2$, and a capacitor unit $C_F$. The inverter unit INU creates from the direct voltage circuit DC, which is filtered by a capacitor $C_{D1}$, an adjustable 3-phase pulse width modulated (PWM) output voltage U, V, W, for supplying an AC motor M. AFE and INU bridges are similar, both consisting of 3 phase switches which are able to connect the phase terminal to either pole DC+, DC−, of the DC intermediate circuit DC. One phase switch comprises of upper leg power components (i.e. a controllable power switch, normally IGBT, with an antiparallel-connected diode) connected to DC+ and similar power components in lower leg, connected to DC−.

Figure 2:
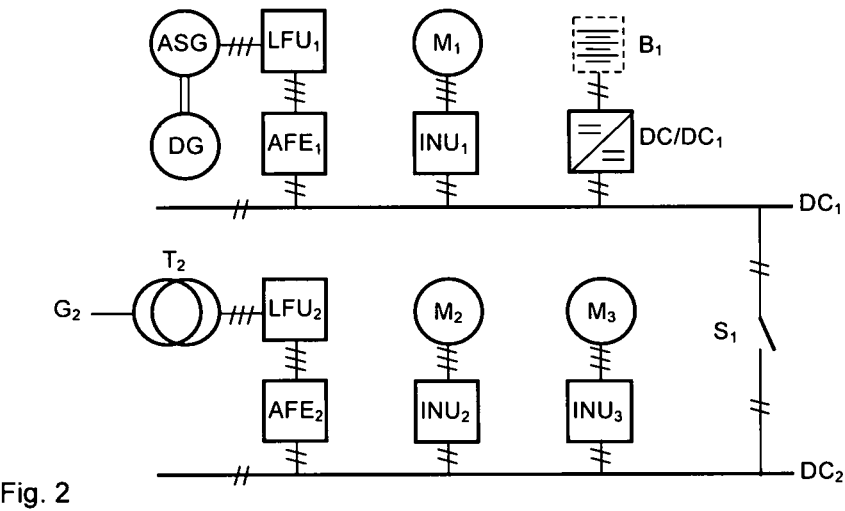
FIG. 2 presents a one-line diagram of a DC distribution power bus system.

FIG. 2 presents an exemplary single-line drawing of a DC power distribution system wherein inverter units and active front end converters, as presented in FIG. 1, may be used. In this example, the DC power distribution system is divided into two subsystems $DC_1$, $DC_2$, which may be intercoupled or separated by a circuit breaker $S_1$.

$DC_1$ is powered by a diesel generator DG via an asynchronous generator ASG, a line filter unit $LFU_1$ and an active front end converter $AFE_1$. A motor drive, comprised of an inverter unit INU, and a motor $M_1$ (feeding e.g. an air-conditioning fan) is an example of a typical load which may be connected to the system. A battery may be connected to the system in order to ensure the power stability ($B_1$ via a voltage levels matching converter $DC/DC_1$).

$DC_2$ is in this example powered from the mains $G_2$ via a transformer $T_2$, a line filter unit $LFU_2$ and an active front end converter $AFE_2$. A couple of motor drives ($INU_2$, $M_2$, $INU_3$, $M_3$) are connected to $DC_2$.

Figure 3A:
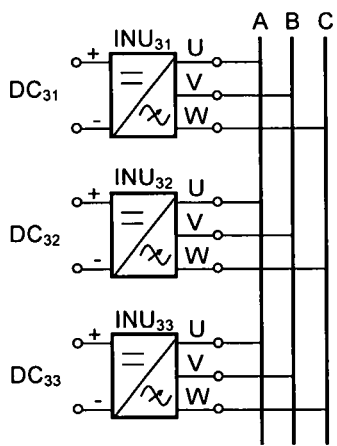
FIG. 3A presents an arrangement in a DC power distribution bus system according to the first embodiment of the invention.

FIG. 3A presents an arrangement according to the present invention on how an arbitrary number of DC power distribution buses, in this example three buses $DC_{31}$, $DC_{32}$, $DC_{33}$, can be intercoupled or separated by using three connecting members A, B, C, and DC bus specific inverter units $INU_{31}$, $INU_{32}$, $INU_{33}$, as circuit breakers. The DC terminals+, −, of each INU are coupled to the corresponding DC bus terminals and their AC terminals U, V, W to the phase-specific connecting members A, B, C.

Figure 3B:
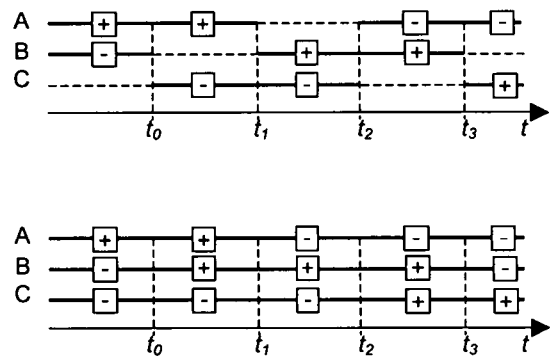
FIG. 3B illustrates timing diagrams related to the first embodiment of the invention.

FIG. 3B illustrates two methods on the coupling of the DC power distribution buses in the arrangement of FIG. 3A. In the diagrams a thick line with a+ sign means that the connecting member is connected to the + pole of all DC distribution power buses. The connection is in practice made by turning on the upper leg power component of the phase switch connected to that connecting member. E.g. a thick A line with + sign means that the upper leg controllable power switches, such as IGBTs, of U-phase in all INUs are turned on. Correspondingly e.g. thick B line with − sign means that the V-phase lower leg controllable power switches, such as IGBTs, of all INUs are turned on. The dotted line in the diagram means that there is no connection between the DC buses via that connecting member. E.g. a dotted line C means that in W-phase switches all controllable power switches, such as IGBTs, are turned off.

The upper part of FIG. 3B illustrates a method, wherein only two connecting members are in use at a time. In order to balance the average loads of power semiconductors and connecting members their operating sequences may be rotated at regular intervals as presented in the figure, at time instants $t_0$, $t_1$, $t_2$, etc. This is called as dynamic loading method in this document. It is also possible to use static loading method by loading continuously only two connecting members, like e.g. A and C during time interval $t_0 \ldots t_1$ in FIG. 3B, and keeping the free one (B) as a spare part. The spare part may in this example be put into service e.g. in a situation where connection member C gets ground-faulted, by turning off all controllable power switches, e.g. IGBTs, in W-phase and turning on corresponding controllable power switches in V-phase.

The lower part of FIG. 3B illustrates a method, wherein all connecting members are used continuously (i.e. all phase switches of all INUs are continuously active). In order to balance the average loads of power semiconductors and connecting members the periods during which two members are connected to the + poles of the DC buses and one member to the − pole, or vice versa, are rotated at regular intervals at time instants $t_0$, $t_1$, $t_2$, etc. A static loading method is possible also in this case, by using the same connection members continuously.

Figure 4A:
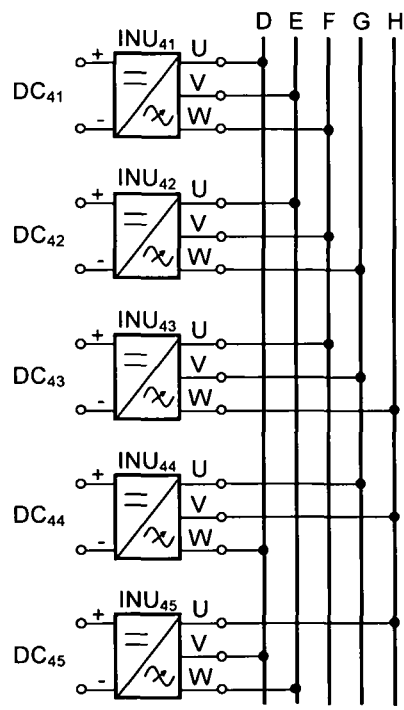
FIG. 4A presents an arrangement in a DC power distribution bus system according to the second embodiment of the invention.

FIG. 4A presents an arrangement according to the present invention on how an arbitrary number of DC power distribution buses, in this example 5 buses $DC_{41} \ldots DC_{45}$, can be intercoupled or separated by using 5 connecting members D, E, F, G, H, and DC bus specific inverter units $INU_{41} \ldots INU_{45}$ as circuit breakers. The DC terminals+, −, of each INU is coupled to the corresponding DC bus terminals and their AC terminals U, V, W to the connecting members such that each connection combination is dissimilar. The dissimilarity connection combination requirement sets the requirement to the number of connecting members; e.g. in case of 5 DC buses the number of connecting members has to be at least 5.

Figure 4B:
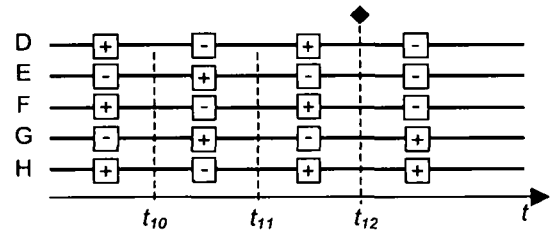
FIG. 4B illustrates a timing diagram related to the second embodiment of the present invention.

FIG. 4B illustrates a method on how the DC power distribution buses $DC_{41} \ldots DC_{45}$ may be intercoupled. In the method, each connecting member is connected to the + or − pole of at least two DC power buses. In order to balance the average loads of power semiconductors and connecting members the operating periods may be rotated similarly to what is presented e.g. above in FIG. 3B (rotation instants $t_{10}$; $t_{11}$). Instead of this dynamic loading method, a similar static loading method, as presented in description of FIG. 3, is possible also in this case by using the same connection members continuously.

The benefit of this arrangement and method is that a faulty DC bus can be isolated such that the undamaged DC buses may stay intercoupled and continue operating normally. An example of this protection method is illustrated in FIG. 4B after the time instant $t_{12}$ where the $DC_{41}$ bus gets short-circuited. The short-circuit means that all connecting members D, E, F are also short-circuited via the freewheeling diodes of $INU_{41}$. In a method embodiment related to this arrangement, the connecting members coupled to the faulty DC bus are connected to one of the poles of the undamaged DC buses (in this example D, E, F are connected to the − pole), and the rest of the connecting members are connected to the opposite pole (i.e. G and H are connected to the + pole).

Figure 5:
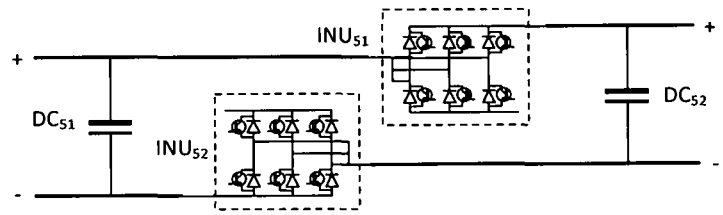
FIG. 5 presents an arrangement in a DC power distribution bus system according to the third embodiment of the invention.

FIG. 5 presents an arrangement according to the present invention on how two DC power distribution buses $DC_{51}$, $DC_{52}$, can be intercoupled or separated by using two inverter units $INU_{51}$, $INU_{52}$ as circuit breakers. In the arrangement the intercoupled AC terminals of the first INU are connected to the + pole of the first DC bus and the DC+ terminal to the second DC bus. In − pole side the DC− terminal of another INU is connected to the first DC bus and the intercoupled AC terminals to the second DC bus. The DC buses can be separated by turning off all controllable power switches, such as IGBTs, because then no balancing current can flow between the DC buses due to the same conducting direction of the freewheeling diodes in both poles. The DC buses can be intercoupled by turning on the controllable power switches, balancing current can then flow via controllable power switches in one pole and diodes in another pole. Due to the parallel-connected phase switches the loadability of the circuit breaker arrangement is maximum what can be reached by using a standard INU module.

In an embodiment related to this arrangement, the controllable power switches of an INU are controlled so that all three phase switches are always in the same position.

While the invention has been described with reference to the previous embodiment, it should be recognized that the invention is not limited to this embodiment, but many modifications and variations will become apparent to persons skilled in the art without departing from the scope of the invention, as defined in the appended claims.

What is claimed is:

1. A direct current (DC) power distribution arrangement, comprising a plurality of DC power distribution subsystems and a controller, wherein each DC power distribution subsystem comprises an inverter unit configured to operate as a subsystem-specific circuit breaker for intercoupling/separating the DC power distribution subsystem to/from the rest of the DC power distribution arrangement, the controller is configured to control at least one inverter unit to operate as a subsystem-specific circuit breaker by opening one or more controllable power switches of the at least one inverter unit in response to a determined DC power distribution subsystem failure or measured overcurrent, and the inverter unit is configured to operate as a subsystem-specific circuit breaker such that:

the DC terminals of the inverter unit are connected to the corresponding DC poles of the DC power distribution subsystem, each AC terminal of the inverter unit is connected to a terminal-specific connecting member, each terminal-specific connecting member is connected to an AC terminal of at least one other inverter unit connected to another DC power distribution subsystem, wherein the controller is configured to control the inverter unit during operation, at least at times, to deliver DC power from the DC terminals of the inverter unit to at least some of the AC terminals of the inverter unit or from the at least some of the AC terminals of the inverter unit to the DC terminals of the inverter unit.

2. The DC power distribution arrangement according to claim 1,
wherein
the number of connecting members is at least the same as the number of AC terminals of each inverter unit.

3. The DC power distribution arrangement according to claim 1,
wherein
the AC terminals of each inverter unit are connected to a unique combination of connecting members.

4. The DC power distribution arrangement according to claim 1,
wherein
the inverter units are configured to keep controllable power switches simultaneously in on-state in an upper or lower leg of one phase switch and in a lower or upper leg of either one another phase switch or of two other phase switches at a time.

5. The DC power distribution arrangement according to claim 4,
wherein
the inverter units are configured to keep the selected controllable power switches in on-state either:
continuously; or
for a predefined duration, in which case the on-state periods of the selected controllable power switches are configured to be rotated such that the average load of each AC terminal of the inverter unit is essentially equal.

6. The DC power distribution arrangement according to claim 1,
wherein
the controller is an upper level controller which is configured to turn on and/or off any controllable power switch in any inverter unit connected to the system.

7. The DC power distribution arrangement according to claim 6,
wherein
one DC power distribution subsystem is configured to be charged to the normal operating voltage level externally, and
the upper level controller is configured to control the inverter unit connected to the fully charged subsystem to operate such that its pulse-width modulated output voltage rises at a predefined speed to the full level.

8. The DC power distribution arrangement according to claim 1,
wherein
the controllable power switches of at least one inverter unit in the system are configured to be kept turned off while at least two connection members are configured to be energized.

9. The DC power distribution arrangement according to claim 1,
wherein
in case of a measured overcurrent in one AC-terminal of an inverter unit, the connection member being connected to that AC-terminal is configured to be de-energized by turning off the controllable power switches at the AC-terminals connected to that specific connection member in all inverter units, and
another replacement connection member is configured to be energized by turning on corresponding controllable power switches in another AC-terminal of all inverter units.

10. The DC power distribution arrangement according to claim 1,
wherein
the connecting member comprises an inductive component for limiting balancing current transients in switching situations.

11. The DC power distribution arrangement according to claim 2,
wherein
the AC terminals of each inverter unit are connected to a unique combination of connecting members.

12. The DC power distribution arrangement according to claim 4,
wherein
the inverter units are configured to keep the selected controllable power switches in on-state for a predefined duration, in which case the on-state periods of the selected controllable power switches are configured to be rotated such that the average load of each AC terminal of the inverter unit is essentially equal.

13. A method for direct current (DC) power distribution arrangement,
wherein
the power distribution arrangement comprises a plurality of DC power distribution subsystems and a controller,
each DC power distribution subsystem comprises an inverter unit,
the inverter unit operates as a subsystem-specific circuit breaker intercoupling/separating the DC power distribution subsystem to/from the rest of the DC power distribution arrangement,
the controller is configured to control at least one inverter unit to operate as a subsystem-specific circuit breaker by opening one or more controllable power switches of the at least one inverter unit in response to a determined DC power distribution subsystem failure or measured overcurrent, and
the inverter unit is configured to operate as a subsystem-specific circuit breaker such that:
the DC terminals of the inverter unit are connected to the corresponding DC poles of the DC power distribution subsystem, and
each AC terminal of the inverter unit is connected to a terminal-specific connecting member,
each terminal-specific connecting member is connected to an AC terminal of at least one other inverter unit connected to another DC power distribution subsystem, wherein the controller is configured to control the inverter unit during operation, at least at times, to deliver DC power from the DC terminals of the inverter unit to at least some of the AC terminals of the inverter unit or from the at least some of the AC terminals of the inverter unit to the DC terminals of the inverter unit.

14. The method in an arrangement according to claim 13, wherein
the inverter units keep controllable power switches simultaneously in on-state in an upper or lower leg of one phase switch and in a lower or upper leg of either one another phase switch or of two other phase switches at a time.

15. The method according to claim 13, wherein
the inverter units keep the selected controllable power switches in on-state either:
continuously; or
for a predefined duration, in which case the on-state periods of the selected controllable power switches are rotated such that the average load of each AC terminal of the inverter unit is essentially equal.

16. The method according to claim 13, wherein
one DC power distribution subsystem is charged to the normal operating voltage level externally, and
the controller is an upper level controller that controls the inverter unit connected to the fully charged subsystem such that its pulse-width modulated output voltage rises at a predefined speed to the full level.

17. The method according to claim 13, wherein
the controllable power switches of at least one inverter unit in the system are kept turned off while at least two connection members are energized.

18. The method according to claim 13, wherein
in case of a measured overcurrent in one AC-terminal of an inverter unit, the connection member being connected to that AC-terminal is de-energized by turning off the controllable power switches at the AC-terminals connected to that specific connection member in all inverter units, and
another replacement connection member is energized by turning on corresponding controllable power switches in another AC-terminal of all inverter units.

19. A direct current (DC) power distribution arrangement, comprising a plurality of DC power distribution subsystems and a controller,
wherein
each DC power distribution subsystem comprises an inverter unit configured to operate as a subsystem-specific circuit breaker for intercoupling/separating the DC power distribution subsystem to/from the rest of the DC power distribution arrangement,
the controller is configured to control at least one inverter unit to operate as a subsystem-specific circuit breaker by opening one or more controllable power switches of the at least one inverter unit in response to a determined DC power distribution subsystem failure or measured overcurrent,
the DC power distribution arrangement comprises two DC power distribution subsystems and two inverter units, wherein the inverter units are configured to operate as pole-specific circuit breakers between the corresponding poles of the two DC power distribution subsystems such that:
the first pole of the first DC power distribution subsystem is connected to a DC terminal of the first inverter unit, and
the corresponding first pole of the second DC power distribution subsystem is connected to the intercoupled AC terminals of the first inverter unit, and
the second pole of the first DC power distribution subsystem is connected to the intercoupled AC terminals of the second inverter unit, and
the corresponding second pole of the second DC power distribution subsystem is connected to a DC terminal of the second inverter unit.

20. The DC power distribution arrangement according to claim 19,
wherein
the inverter units are configured to keep controllable power switches simultaneously in on-state in an upper or lower leg of one phase switch and in a lower or upper leg of either one another phase switch or of two other phase switches at a time.

21. A method of operating an inverter unit as a subsystem-specific circuit breaker in a direct current (DC) power distribution arrangement, comprising:
providing an inverter unit configured to intercouple/separate a DC power distribution subsystem that is part of a DC power distribution arrangement to/from the rest of the DC power distribution arrangement;
controlling, with a controller, the inverter unit to receive DC power from the DC terminals of the inverter unit and deliver DC power to at least some of the AC terminals of the inverter unit or to receive DC power from the at least some of the AC terminals of the inverter unit and deliver DC power to the DC terminals of the inverter unit; and
controlling, with the controller, the inverter unit to separate the DC power distribution subsystem from the rest of the DC power distribution arrangement by opening one or more controllable power switches of the inverter unit in response to a determined DC power distribution subsystem failure or measured overcurrent.

* * * * *